United States Patent
Zeng et al.

(10) Patent No.: US 11,906,791 B2
(45) Date of Patent: Feb. 20, 2024

(54) CONNECTION ASSEMBLY, CABLE PLUG AND CABLE ASSEMBLY

(71) Applicant: SHENNAN CIRCUITS CO., LTD., Shenzhen (CN)

(72) Inventors: Gang Zeng, Shenzhen (CN); Guodong Wang, Shenzhen (CN); Xiaofeng Liu, Shenzhen (CN)

(73) Assignee: SHENNAN CIRCUITS CO., LTD., Shenzhen (CN)

( * ) Notice: Subject to any disclaimer, the term of this patent is extended or adjusted under 35 U.S.C. 154(b) by 356 days.

(21) Appl. No.: 17/396,501

(22) Filed: Aug. 6, 2021

(65) Prior Publication Data

US 2022/0187543 A1 Jun. 16, 2022

Related U.S. Application Data

(63) Continuation of application No. PCT/CN2020/135429, filed on Dec. 10, 2020.

(51) Int. Cl.
*G02B 6/38* (2006.01)

(52) U.S. Cl.
CPC .......... *G02B 6/387* (2013.01); *G02B 6/3858* (2013.01); *G02B 6/3882* (2013.01); *G02B 6/3885* (2013.01)

(58) Field of Classification Search
None
See application file for complete search history.

(56) References Cited

U.S. PATENT DOCUMENTS

| | | | | |
|---|---|---|---|---|
| 5,689,598 A * | 11/1997 | Dean, Jr. | ................ | G02B 6/389 385/71 |
| 6,085,003 A * | 7/2000 | Knight | ................ | G02B 6/3869 385/59 |
| 6,095,695 A * | 8/2000 | Ohtsuka | ............... | G02B 6/3825 385/83 |
| 6,259,856 B1 * | 7/2001 | Shahid | ................ | G02B 6/3879 385/83 |
| 6,402,388 B1 * | 6/2002 | Imazu | ................. | G02B 6/3885 385/60 |
| 6,811,322 B2 * | 11/2004 | Chen | .................... | G02B 6/3875 385/60 |

(Continued)

FOREIGN PATENT DOCUMENTS

| | | |
|---|---|---|
| CN | 105717580 A | 6/2016 |
| CN | 110927891 A | 3/2020 |

(Continued)

OTHER PUBLICATIONS

International search report, International Application No. PCT/CN2020/135429, dated Aug. 30, 2021 (17 pages).

*Primary Examiner* — Jerry Rahll (57) ABSTRACT

The present disclosure provides a connection assembly, a cable plug and a cable assembly. The connection assembly comprises: a core base, configured to fix an end of a cable and comprising a first clamping portion; and a first fixing member, arranged with at least one second clamping portion and defining a first recess in an axial direction; wherein the first recess is configured to laterally accommodate a first portion of the cable different from the end of the cable, and the at least one second clamping portion is configured to fix the core base by directly or indirectly cooperating with the first clamping portion.

20 Claims, 6 Drawing Sheets

(56) References Cited

U.S. PATENT DOCUMENTS

| | | | |
|---|---|---|---|
| 6,988,834 B2 * | 1/2006 | Chen | G02B 6/3875 385/81 |
| 9,551,841 B2 * | 1/2017 | Bradley | G02B 6/3885 |
| 9,664,861 B2 * | 5/2017 | Waldron | G02B 6/4269 |
| 9,720,193 B2 * | 8/2017 | Nishimura | G02B 6/4292 |
| 10,168,488 B1 * | 1/2019 | Fabian | G02B 6/3869 |
| 10,527,802 B2 * | 1/2020 | Wong | G02B 6/3893 |
| 11,635,576 B2 * | 4/2023 | Hu | G02B 6/3825 385/78 |
| 2002/0186931 A1 * | 12/2002 | Seo | G02B 6/3875 385/60 |
| 2004/0081408 A1 * | 4/2004 | Chen | G02B 6/3869 385/78 |
| 2005/0025432 A1 * | 2/2005 | Chen | G02B 6/3869 385/78 |
| 2014/0153875 A1 * | 6/2014 | Bradley | G02B 6/3893 385/71 |
| 2014/0193120 A1 * | 7/2014 | Hodge | G02B 6/3885 385/79 |
| 2015/0198773 A1 * | 7/2015 | Nakama | G02B 6/3846 385/79 |
| 2017/0090126 A1 * | 3/2017 | Lu | G02B 6/3821 |
| 2019/0121032 A1 * | 4/2019 | Childers | G02B 6/3821 |
| 2022/0026643 A1 * | 1/2022 | Hu | G02B 6/3882 |
| 2022/0187543 A1 * | 6/2022 | Zeng | G02B 6/3885 |

FOREIGN PATENT DOCUMENTS

| | | |
|---|---|---|
| CN | 111399135 A | 7/2020 |
| CN | 211528757 U | 9/2020 |
| CN | 211698286 U | 10/2020 |

* cited by examiner

CONNECTION ASSEMBLY, CABLE PLUG AND CABLE ASSEMBLY

CROSS REFERENCE

The present application is a continuation of International (PCT) Patent Application No. PCT/CN2020/135429, filed on Dec. 10, 2020, the content of which is hereby incorporated by reference in its entirety.

TECHNICAL FIELD

The present disclosure relates to the technical field of cable connectors, and in particular to a connection assembly, a cable plug and a cable assembly.

BACKGROUND

With the rapid development of communications technology, cable connectors are often used for racking, system connections and other areas. For example, as an indispensable part of optical communication equipment, optical cable connectors play a very critical and important role.

However, existing connection assemblies are inconvenient to use, i.e., the installation and disassembly process is cumbersome when using.

SUMMARY OF THE DISCLOSURE

The present disclosure provides a connection assembly, a cable plug and a cable assembly to solve the problem of the existing connection assembly's cumbersome installation and removal process.

In order to solve the above technical problems, a technical solution adopted in the present disclosure is to provide a connection assembly, comprising: a core base, configured to fix an end of a cable and comprising a first clamping portion; and a first fixing member, arranged with at least one second clamping portion and defining a first recess in an axial direction; wherein the first recess is configured to laterally accommodate a first portion of the cable different from the end of the cable, and the at least one second clamping portion is configured to fix the core base by directly or indirectly cooperating with the first clamping portion.

In order to solve the above technical problems, another technical solution adopted in the present disclosure is to provide a cable plug, comprising: a cable; and the above connection assembly, configured to laterally accommodate the cable and fixed to the cable.

In order to solve the above technical problems, another technical solution adopted in the present disclosure is to provide a cable assembly, comprising: a female base, comprising a first end face and a second end face; wherein the first end face and the second end face of the female base each have at least one interface; and at least two the connection assemblies, each connected to a corresponding interface of the female base.

DETAILED DESCRIPTION

The technical solutions in the embodiments of the present disclosure will be clearly and completely described below in conjunction with the accompanying drawings in the embodiments of the present disclosure, and it is clear that the described embodiments are only a part of the embodiments of the present disclosure, and not all of them. Based on the embodiments in the present disclosure, all other embodiments obtained by those skilled in the art without creative labor fall within the scope of the present disclosure.

The terms "first", "second", and "third" in the present disclosure are for descriptive purposes only and not to be construed as indicating or implying relative importance or implicitly specifying the number of indicated technical features. Thus, a feature qualified with "first", "second", or "third" may include at least one such feature, either explicitly or implicitly. In the description of the present disclosure, "plurality" means at least two, e.g., two, three, etc., unless otherwise expressly and specifically limited. All directional indications (e.g., up, down, left, right, forward, backward) in the present disclosure are only to explain the relative position relationship, movement, etc., between the components in a particular posture (as shown in the accompanying drawings), and if that particular posture is changed, the directional indications are changed accordingly. In addition, the terms "include" and "have" and any variations thereof are intended to cover non-exclusive inclusion. For example, a process, method, system, product, or apparatus comprising a series of steps or units is not limited to the listed steps or units, but optionally also includes steps or units not listed, or optionally also includes other steps or units inherent to those processes, methods, products, or apparatus.

References herein to "embodiments" mean that particular features, structures, or characteristics described in connection with an embodiment may be included in at least one embodiment of the present disclosure. The presence of the term at various points in the specification does not necessarily mean the same embodiment, nor is it a separate or alternative embodiment that is mutually exclusive with other embodiments. It is understood, both explicitly and implicitly, by those skilled in the art that the embodiments described herein may be combined with other embodiments.

Reference herein to "relative fixation" mean that two elements are directly or indirectly connected in a position-stable state. The position-stable state may refer to a state at which two positions are strictly fixed. The position-stable state may refer to a state at which two positions are slightly changeable within a predefined range.

The following is a detailed description of the present disclosure in conjunction with the accompanying drawings and embodiments.

A fiber optic cable connector mainly includes an adapter and at least one connection assembly connected to the adapter; wherein the connection assembly generally includes a housing, and a plug core and a snap member arranged in the housing; the housing is configured to fix with the adapter, and the plug core is configured to fix an end of a cable and terminate with the adapter; the snap member is configured to fix the plug core, and the snap member defines a through hole extending toward the plug core, the through hole being configured for the fiber optic cable to pass through. In a specific use process, a fiber optic cable passes through the through hole on the snap member and is fixed with the plug core, then the plug core is terminated with the adapter.

For convenience, the embodiments of the present disclosure describe the cable as an example of a fiber optic cable, but it should be understood that anything belonging to a cable such as an electric cable, is applicable to the present disclosure.

Figure 1:
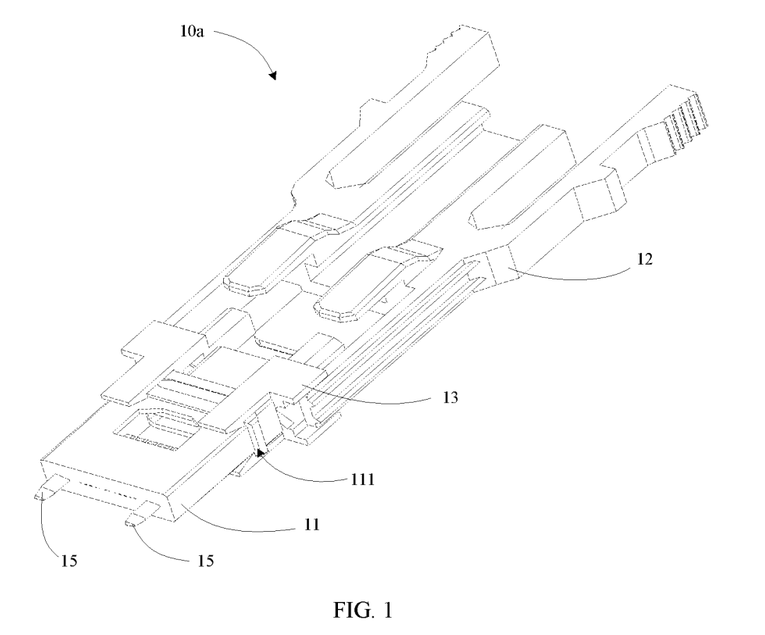
FIG. 1 is a schematic view of an assembled structure of a connection assembly according to an embodiment of the present disclosure.
Figure 2:
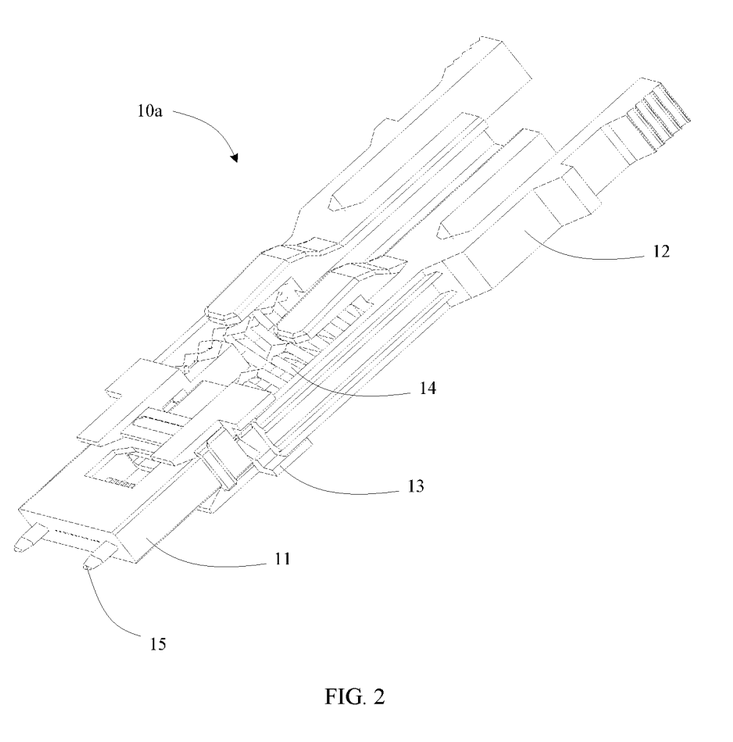
FIG. 2 is a schematic view of an assembled structure of a connection assembly according to another embodiment of the present disclosure.
Figure 3:
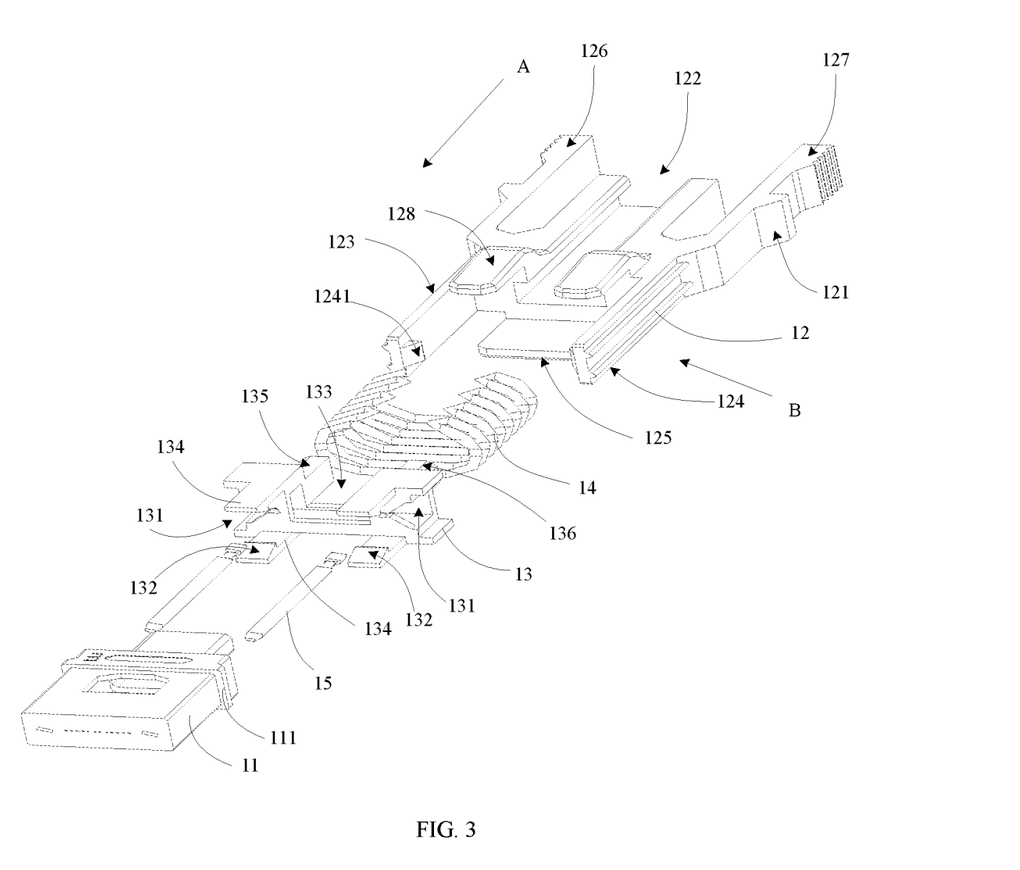
FIG. 3 is a schematic view of a disassembled structure of the connection assembly shown in FIG. 2.

FIG. 1 is a schematic view of an assembled structure of a connection assembly according to an embodiment of the present disclosure. FIG. 2 is a schematic view of an assembled structure of a connection assembly according to another embodiment of the present disclosure FIG. 3 is a schematic view of a disassembled structure of the connection assembly shown in FIG. 2. In the embodiments, a connection assembly 10a is provided which can be configured to fix a cable. Specifically, the connection assembly 10a may include a core base 11 and a first fixing member 12.

Figure 7:
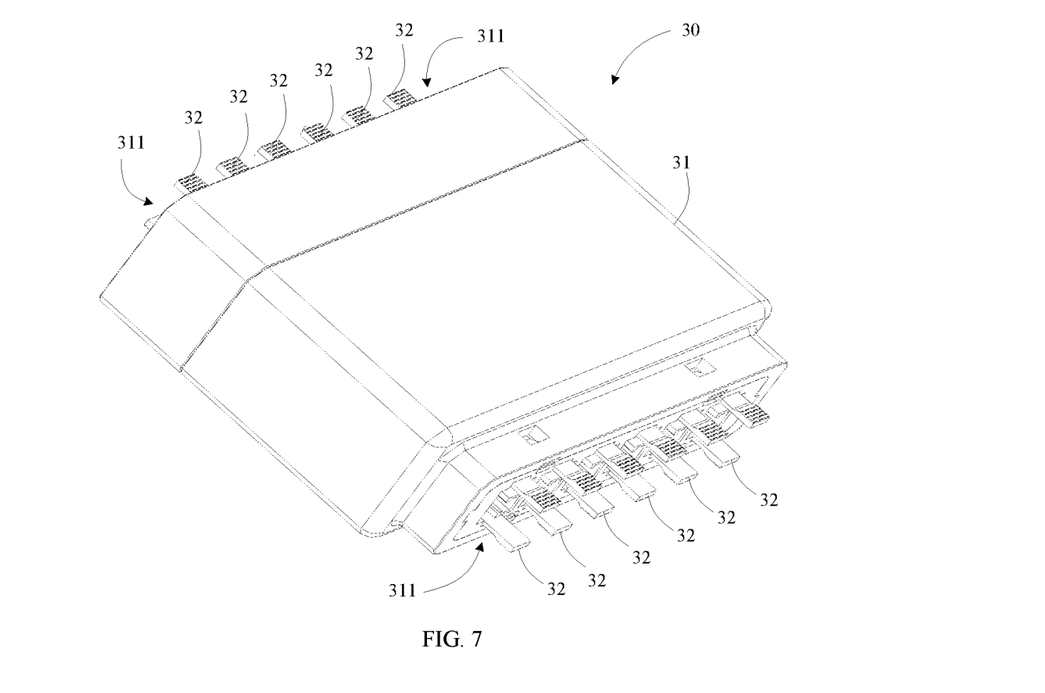
FIG. 7 is a schematic view of an assembled structure of a cable assembly according to an embodiment of the present disclosure.

The core base 11 may be configured to fix an end of the cable, in specific embodiments, the cable fixed with the core base 11 may be inserted in a female base 31 (as shown in FIG. 7 below). The female base 31 may be an adapter. The core base 11 may include a first clamping portion 111. The first clamping portion 111 may be an annular tab or a groove formed/defined on an outer side wall of the core base 11.

The core base 11 may be a male plug core or a female plug core, which can be selected according to actual needs. In specific embodiments, to solve the problem that male/female pins are not easily interchangeable during the assembly and testing of actual plug core products, a clamping pin 15 may be arranged on the connection assembly 10a according to actual needs. Correspondingly, the core base 11 may define a pin hole penetrating in an axial direction A, and the clamping pin 15 protrudes out of the core base 11 through the pin hole. Specifically, the clamping pin 15 is arranged when assembling male mechanical transfer (MT) pins, and the clamping pin 15 is not arranged when assembling female MT pins, such that the connection assembly 10a may be with ferrule structures as male/female configurations for assembly and has good interchangeability. In specific embodiments, the clamping pin 15 may be arranged directly or indirectly on a side surface of the first fixing member 12 towards the core base 11 and extends towards the core base 11. Specifically, the clamping pin 15 is applicable to the IEC standard.

The first fixing member 12 is arranged with a second clamping portion 121 and defines a first recess 122 in the axial direction A. The second clamping portion 121 may be arranged at an outer circumference of the first fixing member 12, or at an end of the first fixing member 12, etc. The first recess 122 is configured to laterally accommodate a first portion of the cable at another end different from the end of the cable. In this way, in the specific use process, the cable can be directly installed in the connection assembly 10a or removed from the connection assembly 10a through an opening of the first recess 122, without the need to insert an end of the cable into and through the first fixing member 12, without the need to separate the core base 11 from the cable and then pulling out the first fixing member 12, and without the need to disassemble the assembly between the core base 11 and the first fixing member 12, making the installation and removal process of the fiber optic cable simpler. The lateral accommodation is different from an axial A socket, the lateral accommodation is to bring the cable radially close to the first fixing member 12, bring the first fixing member 12 radially close to the cable, or bring both close to each other at the same time. The first recess 122 may be parallel, substantially parallel or angled to the first portion of the cable and facing the first portion of the cable. First the outer circumference of the first portion of the cable enters the first recess 122, and eventually the first portion of the cable is completely sunk into the first recess 122. Specifically, a minimum width of the opening of the first recess 122 is less than a maximum slot width of the first recess 122 and less than or equal to the width of the cable to radially limit the cable accommodated therein. A maximum slot width of the first recess 122 is greater than the width of the cable to ensure that the cable can be accommodated in the first recess 122. Specifically, a cross-sectional view of the first recess 122 may have a convex structure. The second clamping portion 121 is configured to directly or indirectly cooperate with the first clamping portion 111 to fix the core base 11. A radial direction B may be any direction perpendicular to the axial direction A, and one is illustrated in FIG. 3.

In some embodiments, the second clamping portion 121 is configured to indirectly cooperate with the first clamping portion 111 to fix the core base 11 to the female base 31. Specifically, the core base 11 is fixed directly or indirectly with the first fixing member 12 through the first clamping portion 111. The female base 31 is arranged with a third clamping portion, and the second clamping portion 121 is fixed with the third clamping portion on the female base 31 to positional limit the core base 11 fixed with the first fixing member 12 to the female base 31, as an example in the following embodiments. The second clamping portion 121 may be a bump and the third clamping portion may be a dimple matching the bump.

Of course, in other embodiments, the second clamping portion 121 may also directly or indirectly cooperate with the first clamping portion 111 to directly fix the core base 11 to the first fixing member 12, i.e., the second clamping portion 121 may directly fasten to the first clamping portion 111 to directly fix the core base 11 to the first fixing member 12, or the second clamping portion 121 may indirectly fasten to the first clamping portion 111 on the core base 11 through another element such as the female base 31, thereby achieving fixing of the core base 11 and the first fixing member 12. For example, the second clamping portion 121 may snap to the third clamping portion on the female base 31 to achieve relative fixation of the first fixing member 12 and the female base 31, and the first fixing member 12 is relatively fixed to the core base 11 directly or through another element to finally fix the core base 11 to the female base 31.

Further, the core base 11 may be fixed directly or indirectly with the first fixing member 12. By fixing the core base 11 with the first fixing member 12, it is possible to pull out the core base 11 together by unplugging the first fixing member 12 when unplugging the connection assembly 10a, thereby preventing the problem of the core base 11 being left in the female base 31 during plugging and unplugging.

Specifically, the first fixing member 12 may be arranged with a first connecting arm 123 and a second connecting arm 124 extending in the axial direction A on opposite sides, and the first connecting arm 123 and the second connecting arm 124 extend in a same direction. An end of the first connecting arm 123 and an end of the second connecting arm 124 include a fourth clamping portion 1241. The fourth clamping portion 1241 is configured to directly or indirectly cooperate with the first clamping portion 111 to relatively fix the core base 11 and the first fixing member 12.

In some embodiments, the fourth clamping portion 1241 is directly fastened to the first clamping portion 111 to relatively fix the core base 11 and the first fixing member 12. Specifically, the fourth clamping portions 1241 may be projections formed on the first connecting arm 123 and the second connecting arm 124, and the projection may specifically be an oblique inverted triangular shaped buckle. The fourth clamping portion 1241 on the first connecting arm 123 and the fourth clamping portion 1241 on the second connecting arm 124 are arranged toward each other. In the embodiments, the first clamping portion 111 may be a recess formed on an outer side wall of the core base 11, and the fourth clamping portion 1241 is embedded in the first clamping portion 111 to achieve relative fixation between the core base 11 and the first fixing member 12. Of course, the fourth clamping portions 1241 may also be recesses formed on the first connecting arm 123 and the second connecting arm 124, and the first clamping portion 111 may be a projection formed on the outer side wall of the core base 11. Specifically, the relative fixation between the core base 11 and the first fixing member 12 includes both fixed connection or slidable connection between the two; i.e., the fourth clamping portion 1241 may be directly seated in the first clamping portion 111 to fixedly connect the core base 11 to the first fixing member 12; or the fourth clamping portion 1241 may slide in the first clamping portion 111 to achieve a slidable connection between the core base 11 and the first fixing member 12 while fixing the core base 11 to the first fixing member 12.

Further, an end of the first fixing member 12 may be arranged with a first limiting plate 125, the extension direction of the first limiting plate 125 is the same as the extension direction of the first connecting arm 123 and the second connecting arm 124. The first limiting plate 125, the first connecting arm 123 and the second connecting arm 124 define a holding slot corporately, which is open along the axial direction A, i.e., the holding slot is open at both ends along the extension direction of the first connecting arm 123 and communicates with the first recess 122. The holding slot is further open laterally, i.e., another side of the holding slot that is not connected to the first connecting arm 123 and the second connecting arm 124 is also open, and the lateral opening is in the same direction as the lateral opening of the first recess 122. In this way, a second portion of the cable can be laterally accommodated in the holding slot. The second portion is a portion of the cable between the end of the cable and the first portion. Specifically, the holding slot may be rectangular, circular, irregular, etc. in shape.

The first fixing member 12 may be further arranged with a first operating arm 126 and a second operating arm 127 extending backwardly to the first connecting arm 123 and the second connecting arm 124. In specific embodiments, the number of the second clamping portions 121 is at least two, and the at least two second clamping portions 121 are arranged on an outer side of the first operating arm 126 and the second operating arm 127, respectively, to snap into the third clamping portion on the female base 31. Specifically, the first operating arm 126 and the second operating arm 127 may be resilient arms and may be close to each other under an external force to facilitate insertion into the female base 31. The first operating arm 126 and the second operating arm 127 may return to a natural state after the external force disappears. In this way, the second clamping portion 121 may snap into and fix with the third clamping portion in the female base 31.

In some embodiments, to enable a tight connection between the core base 11 and the female base 31 and reduce insertion loss, an elastic member 14 may be further arranged between the core base 11 and the first fixing member 12, such that the elastic member 14 directly resiliently resists the core base 11 and the first fixing member 12, and the first fixing member 12 provides the core base 11 a force that pushes the core base 11 to the female base 31 in the axial direction A, thus making the core base 11 tightly connected to the female base 31. In the embodiments, the core base 11 and the first fixing member 12 can slide relative to each other, i.e., the two are slidably connected, and the elastic member 14 is in a pre-compressed state when the connection assembly 10a is idle, i.e., the elastic member 14 is in a compressed state. It is understood that, in the specific use process, when the core base 11 is connected to the female base 31, the female base 31 gives the core base 11 a force toward the first fixing member 12, and the elastic member 14 further undergoes elastic deformation under the force, such that the elastic member 14 gives the core base 11 a force toward the female base 31 under a driving force of the elastic member 14 returning to a natural extension state, and then the core base 11 is tightly connected to the female base 31, preventing the two from detaching from each other.

Specifically, the elastic member 14 is at least partially embedded between the first connecting arm 123 and the second connecting arm 124, and partially located in the holding slot. Since the elastic member 14 is arranged in the holding slot and the holding slot is a lateral opening slot, the elastic member 14 can be directly installed or removed in the holding slot through the lateral opening of the holding slot during actual installation and removal. It is not necessary to pre-install the elastic member 14 before terminating the core base 11, but can directly use the connection assembly 10a after termination to meet the effect of pre-pressure elasticity. In this way, the installation and removal process of the elastic member 14 may be simpler, facilitating later maintenance.

In some embodiments, the shape of the elastic member 14 can be matched with the shape of the holding slot to facilitate the installation and fixation of the two.

In some embodiments, the elastic member 14 may be a semi-enclosed member, for example, may be curved. The semi-enclosed member forms a slot that laterally accommodates the second portion of the cable. Specifically, the opening of the slot is oriented in the same direction as the opening of the holding slot, and the minimum width of the opening of the slot of the semi-enclosed member is less than the maximum slot width of the slot, and the minimum width of the opening of the slot of the semi-enclosed member is less than or equal to the width of the cable, positional limiting the cable accommodated in the slot. It is understood that during the specific installation or removal process, a thinner side of the cable can be installed or removed from the slot at an angle. Specifically, the maximum slot width of the slot is greater than the width of the cable to ensure that the cable can be accommodated in the slot.

In some embodiments, to prevent the elastic member 14 from falling out of the opening of the holding slot, a second limiting plate 128 may be further arranged on the first fixing member 12. The second limiting plate 128 is located on a side of the first connecting arm 123 and the second connecting arm 124 opposite to the first limiting plate 125. The second limiting plate 128 and the first limiting plate 125 cooperate with the first connecting arm 123 and the second connecting arm 124 to form a limiting space to prevent the elastic member 14 embedded between the first connecting arm 123 and the second connecting arm 124 from radially falling out of the limiting space. Specifically, the cross-section of the limiting space perpendicular to the axial direction A (i.e., the cross-section perpendicular to the plane in which the first connecting arm 123 and the second connecting arm 124 are located) may be rectangular in shape, and the shape of the elastic member 14 matches the shape of the limiting space to facilitate limiting of the elastic member 14.

In some embodiments, the radial B dimension of the elastic member 14 may also be made slightly larger than the radial B dimension of the holding slot to hold the elastic member 14 in the holding slot by a resisting force between the elastic member 14 and the first limiting plate 125, the first connecting arm 123 and the second connecting arm 124.

In some embodiments, the second limiting plate 128 extends in the same direction as the first connecting arm 123 and the second connecting arm 124. The number of the second limiting plates 128 is at least two. The at least two second limiting plates 128 are each arranged on a side of the opening of the slot correspondingly along a width direction of the opening of the slot.

In other embodiments, the number of the second limiting plates 128 is at least two. The at least two second limiting plates 128 are each arranged on a side of the opening of the slot correspondingly along a width direction of the slot, are arranged vertically or inclined to the first connecting arm 123 or the second connecting arm 124, and extend toward the opening of the slot.

Specifically, the spacing between the corresponding two second limiting plates 128 arranged on both sides of the opening of the slot is the same as the width of the opening of the first recess 122 to provide avoidance of the path of the cable installation in or removal from the connection assembly 10a. Moreover, because the spacing between the two second limiting plates 128 is greater than the radial B dimension of the elastic member 14, such as the maximum radial B dimension, can prevent the elastic member 14 from dislodging from the gap between the two second limiting plates 128.

In other embodiments, the elastic member 14 may also be arranged at edges of the limiting space, i.e., at edges of both sides of the holding slot along the width direction, so as to prevent a position of the limiting space directly opposite to the first recess 122. Specifically, to ensure the intensity of the resilient force given to the core base 11 to move away from the first fixing member 12, at least two elastic members 14 may be arranged, and the at least two elastic members 14 may be arranged along the radial direction B of the limiting space correspondingly at the edges of both sides of the limiting space and extend in the direction of the axial direction A of the limiting space. The axial direction A of the limiting space and the axial A (length) direction of the holding slot are the same as the extension direction of the first recess 122. Specifically, the elastic member 14 may be in the form of strips.

In other embodiments, the connection assembly 10a may further include a second fixing member 13, and the core base 11 is specifically fixed to the first fixing member 12 by the second fixing member 13. In the embodiments, the elastic member 14 is specifically arranged between the second fixing member 13 and the first fixing member 12, resiliently against the second fixing member 13 and the first fixing member 12, i.e., the elastic member 14 is indirectly against the core base 11. In the embodiments, the clamping pin 15 may be specifically arranged on a wall of the second fixing member 13 toward the side of the core base 11 and extending in a direction away from the first fixing member 12. Specifically, the core base 11 is arranged with a penetration hole for the clamping pin 15 to penetrate, and the clamping pin 15 may extend from the end of the core base 11 away from the second fixing member 13 for connection to the female base 31. Specifically, the number of the clamping pins 15 may be two. A side surface of the second fixing member 13 towards the core base 11 define two clamping slots. An end of one clamping pin 15 is embedded in a corresponding clamping slot to fix with the second fixing member 13. Specifically, the clamping pins 15 correspond to the clamping slots one to one.

Specifically, the second fixing member 13 may be arranged with a fifth clamping portion 131, a sixth clamping portion 132, and a second recess 133 in the axial direction A. The second recess 133 is connected to the first recess 122 in the axial direction A for laterally accommodating a third portion of the cable, the third portion being specifically between the end of the cable and the second portion of the cable. The second recess 133 may have the same or similar structure as the first recess 122.

The fifth clamping portion 131 is configured to snap with the fourth clamping portion 1241 of the first connecting arm 123 and the fourth clamping portion 1241 of the second connecting arm 124 to relatively fix the second fixing member 13 and the first fixing member 12. Specifically, the number of fifth clamping portions 131 is at least two, and the fifth clamping portions 131 are arranged on opposite sides of the second fixing member 13. The fourth clamping portion 1241 of the first connecting arm 123 and the fourth clamping portion 1241 of the second connecting arm 124 are arranged toward each other and are respectively snap-fitted to the two fifth clamping portions 131. In some embodiments, the fifth clamping portion 131 may be specifically a recess formed on an outer side of the second fixing member 13, and the fourth clamping portion 1241 is specifically embedded in the recess to limit the fifth clamping portion 131 through the side wall of the recess to prevent the first fixing member 12 from falling off from the second fixing member 13. Specifically, the length of the fourth clamping portion 1241 is greater than the length of the fifth clamping portion 131 such that the fifth clamping portion 131 can slide within the fourth clamping portion 1241 to achieve a slidable connection between the first fixing member 12 and the second fixing member 13, thereby enabling the elastic member 14 arranged between the two to give an axial push through the second fixing member 13. The sliding direction can be the same as the extension direction of the first recess 122. Specifically, the spacing between the two fourth clamping portions 1241 is greater than the spacing between the two fifth clamping portions 131, and the fourth clamping portion 1241 is slidably connected with a corresponding fifth clamping portion 131.

The sixth clamping portion 132 is configured to snap with the first clamping portion 111 to relatively fix the core base 11 and the second fixing member 13. Specifically, in the embodiments, the first clamping portion 111 may be a tab formed on the outer wall of the core base 11, and the sixth clamping portion 132 is specifically snap-fitted to the tab to be fixed to the core base 11, thereby preventing the core base 11 from being left in the female base 31 during insertion and removal. The tab is specifically formed at an end of the core base 11 near the second fixing member 13 and is in the shape of a ring.

In some embodiments, the second fixing member 13 is arranged with at least two third connecting arms 134. The at least two third connecting arms 134 are distributed along a circumferential direction of the second fixing member 13 and are oriented in the same direction, specifically, in a direction extending away from the first fixing member 12. In the embodiments, the number of the sixth clamping portions 132 is at least two, and the sixth clamping portions 132 are each arranged at the end of the third connecting arm 134 away from the first fixing member 12, i.e., one third connecting arm 134 corresponds to one sixth clamping portion 132. Specifically, the sixth clamping portions 132 on the at least two third connection arms 134 are arranged toward each other. The sixth clamping portion 132 is specifically lapped on the tab to be fixed to the core base 11.

Specifically, the number of the third connecting arms 134 may be four, and the four third connecting arms 134 are arranged opposite each other two by two to form a holding space to accommodate at least a portion of the core base 11 for fixing the core base 11.

Specifically, the second fixing member 13 is also arranged with a fourth connecting arm 135 and a fifth connecting arm 136 extending in the axial direction A on opposite sides. The fourth connecting arm 135 and the fifth connecting arm 136 are arranged back from the third connecting arm 134 for limiting the elastic member 14 in the radial direction B in cooperation with the first connecting arm 123 and the second connecting arm 124, thereby preventing the elastic member 14 from moving in the holding slot or limiting space along the width direction.

Specifically, at least one of the core base 11, first fixing member 12, elastic member 14 and second fixing member 13 is an axisymmetric structure. In some embodiments, the core base 11, first fixing member 12, elastic member 14 and second fixing member 13 are all axisymmetric structures. The extension direction of first recess 122 is the same as the extension direction of a symmetry axis of first fixing member 12, the extension direction of the elastic member 14 is the same as the extension direction of a symmetry axis of the elastic member 14, and the extension direction of the second recess 133 is the same as the direction of a symmetry axis of the second fixed member 13. Each component has a symmetrical structure, thus there is no positive or negative special anti-dumbing requirement when the connection assembly 10a is installed with the female base 31, the structure is streamlined, and the degree of interchangeability of the connection assembly 10a and the female base 31 is high.

Specifically, by virtue of the connection assembly 10a provided in the present disclosure, with the second clamping portion 121 on the first fixing member 11 to achieve the connection assembly 10a and the female base 31 fixed by the second clamping portion 121 and the third clamping portion on the female base 31, fast installation and disassembly between the connection assembly 10a and the female base 31 may be realized, greatly improving the assembly efficiency; and compared with the existing technology, which requires a separate outer shell to be fixed to the female base 31, the size of the connection assembly 10a is greatly reduced, making the assembled cable assembly 30 (as shown in FIG. 7 below) more compact and dense, effectively improving the integration of the cable assembly 30, and making the structure of the connection assembly 10a simpler, greatly reducing the production cost; at the same time, the connection assembly 10a in the present disclosure provides the relative fixation of each component by mutual snap, making the installation and removal of the connection assembly 10a more flexible; the connection assembly 10a is especially suitable for high-density applications on communication module products.

The present disclosure provides a connection assembly 10a, arranged with a core base 11 and a first clamping portion 111 on the core base 11 to fix an end of a cable through the core base 11 in specific use; a first fixing member 12 is arranged with a second clamping portion 121 and a first recess 122 in axial direction A of the first fixing member 12, such that a first part of the cable different from the end of the cable is laterally accommodated by the first recess 122, and the core base 11 is fixed by the second clamping portion 121 directly or indirectly with the first clamping portion 111. Since the connection assembly 10a is laterally accommodated by the first recess 122 opened on the first fixing member 12, the cable can be directly installed in or removed from the connection assembly 10a through the opening of the first recess 122, without having to remove the core base 11 and without having to sleeve the first fixing member 12 on the cable before installing the core base 11, making the installation and removal of the cable a relatively simple process.

Figure 4:
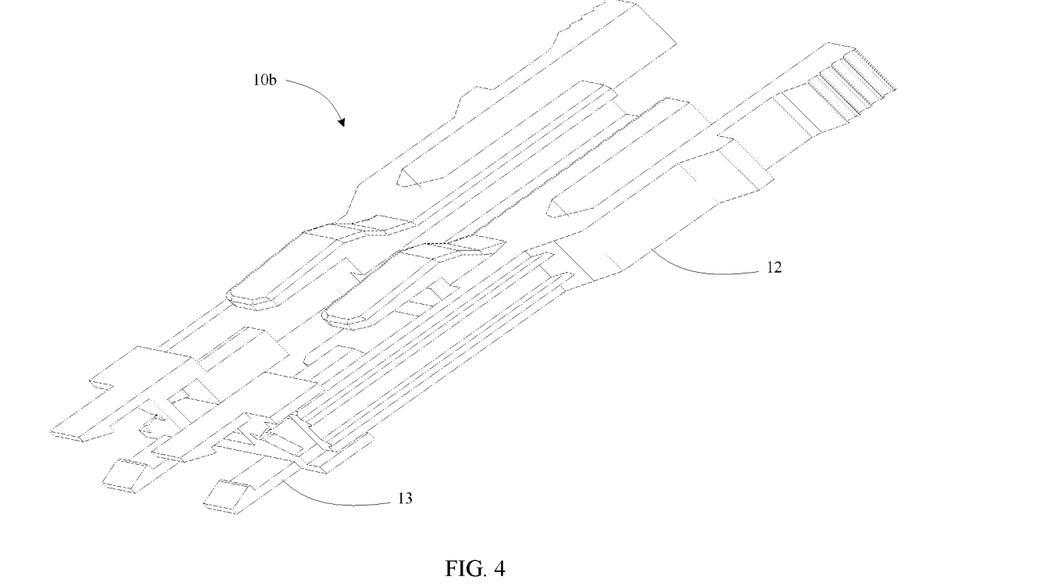
FIG. 4 is a schematic view of an assembled structure of a connection assembly according to further another embodiment of the present disclosure.

FIG. 4 is a schematic view of an assembled structure of a connection assembly according to further another embodiment of the present disclosure. In the embodiments, another connection assembly 10b is provided, which differs from the connection assembly 10a provided in the above embodiments in that the connection assembly 10b does not include the core base 11, i.e., the assembly 10b includes a first fixing member 12 and a second fixing member 13.

The first fixing member 12 is arranged with a second clamping portion 121 and defines a first recess 122 in the axial direction A, the first recess 122 being configured to laterally accommodate a first portion of the cable; the second fixing member 13 is arranged with a fifth clamping portion 131 and a second recess 133 in the axial direction A, the second recess 133 being configured to laterally accommodate a third portion of the cable different from the first portion; wherein the second clamping portion 121 and the fifth clamping portion 131 directly or indirectly cooperate to fix the first fixing member 12 and the second fixing member 13.

In some embodiments, the second clamping portion 121 is configured to indirectly cooperate with the fifth clamping portion 131 to fix the second fixing member 13 to the female base 31. Specifically, the second fixing member 13 is fixed directly or indirectly to the first fixing member 12 by the fifth clamping portion 131. The following embodiment takes the direct fixation as an example. The female base 31 is arranged with a third clamping portion, and the second clamping portion 121 is specifically fixed to the third clamping portion on the female base 31 to limit the second fixing member 13 fixed to the first fixing member 12 to the female base 31, as an example in the following embodiment.

Of course, in other embodiments, the second clamping portion 121 may also directly or indirectly cooperate with the fifth clamping portion 131 to directly fix the second fixing member 13 to the first fixing member 12. That is, the second clamping portion 121 may directly snap with the fifth clamping portion 131 to fix the second fixing member 13 relative to the first fixing member 12, or the second clamping portion 121 may indirectly snap with the fifth clamping portion 131 on the second fixing member 13 through other components, thereby relatively fix the second fixing member 13 and the first fixing member 12, after which other clamping portions on the first fixing member 12 are fastened to the third clamping portion on the female base 31 to fix the second fixing member 13 to the female base 31.

Specifically, the specific structure and function of the first fixing member 12 and the second fixing member 13 and the connection relationship between the two can be found in the above description, and the first fixing member 12 and the second fixing member 13 can achieve the same or similar technical effect, which will not be repeated herein.

Figure 5:
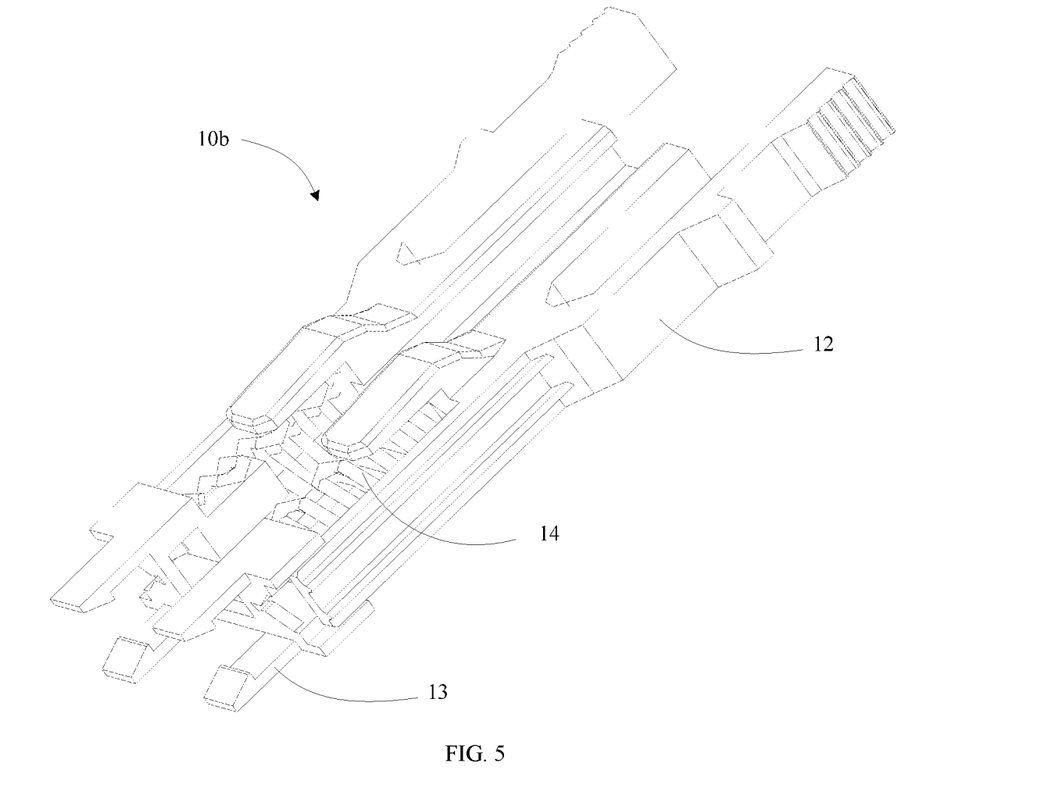
FIG. 5 is a schematic view of an assembled structure of a connection assembly according to further another embodiment of the present disclosure.

FIG. 5 is a schematic view of an assembled structure of a connection assembly according to further another embodiment of the present disclosure. In some embodiments, the connection assembly 10b may also include an elastic member 14, arranged between the second fixing member 13 and the first fixing member 12 and resiliently resists the second fixing member 13 and the first fixing member 12 to give the second fixing member 13 a force to move axially away from the first fixing member 12. The specific structure and function of the elastic member 14 and the position connection relationship between the elastic member 14 and the first fixing member 12 and the second fixing member 13 can be found in the above-mentioned description, which will not be repeated herein.

In specific use, the connection assembly 10b can be used together with the above-mentioned core base 11. The connection between the core base 11 and the connection assembly 10b can be specifically referred to the above-mentioned embodiments to provide the connection assembly 10a between the core base 11 and the second fixing member 13, referring to the above description. In the embodiments, the elastic member 14 indirectly gives the insert base 11 a force to move axially away from the first fixing member 12, as described in the above description.

The connection assembly 10b of the embodiments defines the first recess 122 in the first fixing member 12 and the second recess 133 in the second fixing member 13 to laterally accommodate the first and third portions of the cable, making the cable installation and removal process simpler; at the same time, the connection assembly 10b does not require the use of an outer shell, thus greatly reducing the size of the connection assembly 10b and effectively improving the integration of the cable assembly 30. In addition, in the specific use of the process, the connection assembly 10b can be selected to connect to a male plug or a female plug according to the actual need, such that interchangeability is better.

Figure 6:
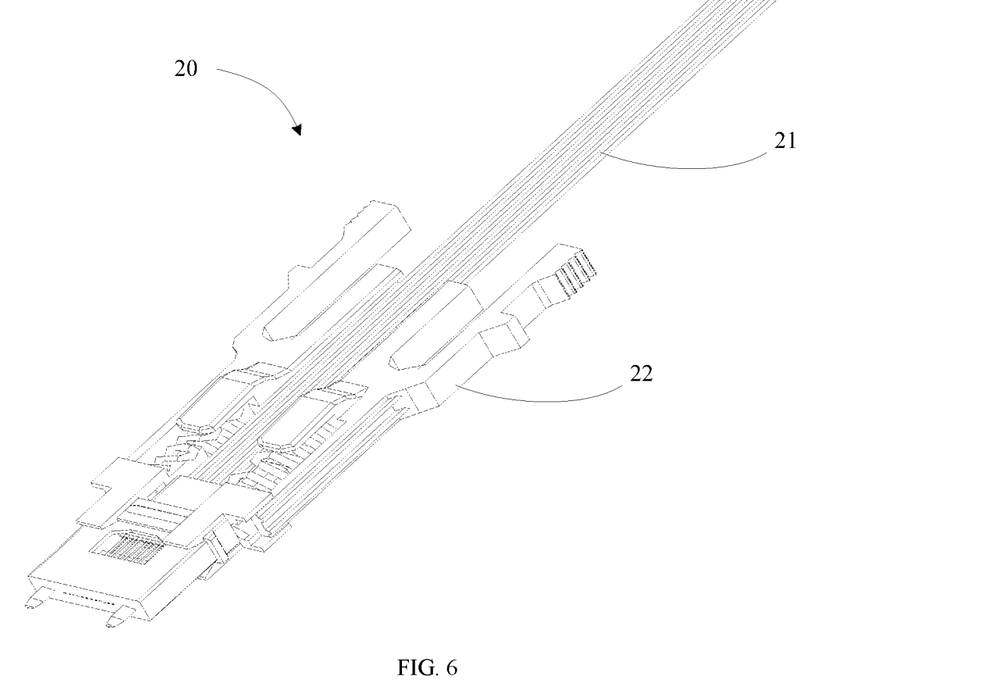
FIG. 6 is a schematic view of an assembled structure of a cable plug according to an embodiment of the present disclosure.

FIG. 6 is a schematic view of an assembled structure of a cable plug according to an embodiment of the present disclosure. In the embodiments, a cable plug 20 is provided. The cable plug 20 includes a cable 21 and a connection assembly 22. The cable 21 may be specifically an optical fiber. The connection assembly 22 is configured to laterally accommodate the cable 21, and an end of the cable 21 is fixed with the connection assembly 22 for terminating with the female base 31 to carry out optical signal transmission or testing.

Specifically, the connection assembly 22 may be the connection assembly 10a provided in any of the above embodiments, the specific structure and function of which can be found in the specific structure and function of the connection assembly 10a provided in the above embodiments, and the connection assembly 22 can achieve the same or similar technical effect, which will not be repeated herein.

In the cable plug 20 provided in the embodiments, with the cable 21 and the connection assembly 22, the cable 21 is laterally accommodated in the first recess 122 and/or second recess 133 on the connection assembly 22, such that the cable 21 can be installed and removed from the connection assembly 22 through the opening of the first recess 122 and/or second recess 133, thus making the installation and removal of the cable 21 simpler. Moreover, the connection assembly 22 does not need to be arranged with the outer shell, thus greatly reducing the size of the connection assembly 22 and effectively improving the integration of the cable assembly.

FIG. 7 is a schematic view of an assembled structure of a cable assembly according to an embodiment of the present disclosure. In the embodiments, a cable assembly 30 is provided. The cable assembly 30 may be specifically a fiber optic cable assembly for connecting a fiber optic cable such that the light energy output from a transmitting fiber optic cable can be maximally coupled to a receiving fiber optic cable.

Specifically, the cable assembly 30 may include a female base 31 and at least two connection assemblies 32. The female base 31 may be an adapter and include a first end face and a second end face arranged back from each other. The first end face and the second end face of the female base 31 each have at least one interface 311, respectively. The connection assemblies 32 are each configured to fix the cable. The at least two connection assemblies 32 are each connected to one interface 311 of the female base 31 to terminate the cable fixed therewith with the female basis 31, thereby realizing the transmission of the optical signal. Specifically, one connection assembly 32 corresponds to one interface 311.

Specifically, the connection assembly 32 may be the connection assembly 10a provided in the above embodiments, the specific structure and function of which can be found in the specific structure and function of the connection assembly 10a provided in the above embodiments, and the connection assembly 32 can achieve the same or similar technical effect, which will not be repeated herein.

In specific use, the cable can be fixed and installed with the connection assembly 32 first, and then the connection assembly 32 is assembled with the adapter. In some embodiments, the adapter may be provided with a snap-lock structure, such as the recesses involved above, and the connection assembly 32 may be quickly installed with the snap-lock structure on the paired adapter. Specifically, the cable assembly 30 can be assembled quickly according to the needs of different practical application scenarios, and cooperate with the snap-lock structure on the paired adapter to achieve rapid installation and testing applicable. The structure helps the cable assembly 30 fast plugging assembly and disassembly, meeting the application for the communication module products.

In the cable assembly 30 provided in the embodiments, with the female base 31 and the connection assembly 32, at least one interface 311 is arranged at the first end face and the second end face of the female base 31, and the connection assembly 32 is plugged into the interface 311 of the female base 31 for optical signal transmission. Since the structure of the connection assembly 32 is relatively simple, and there is no need for another outer shell, making the cable assembly 30 more integrated. In addition, the core base 11 in the connection assembly 32 is fixed directly or indirectly with the first fixing member 12, such that the core base 11 can be pulled out together during the plugging and unplugging process, preventing the problem of the core base 11 being left in the female base 31.

Figure 8:
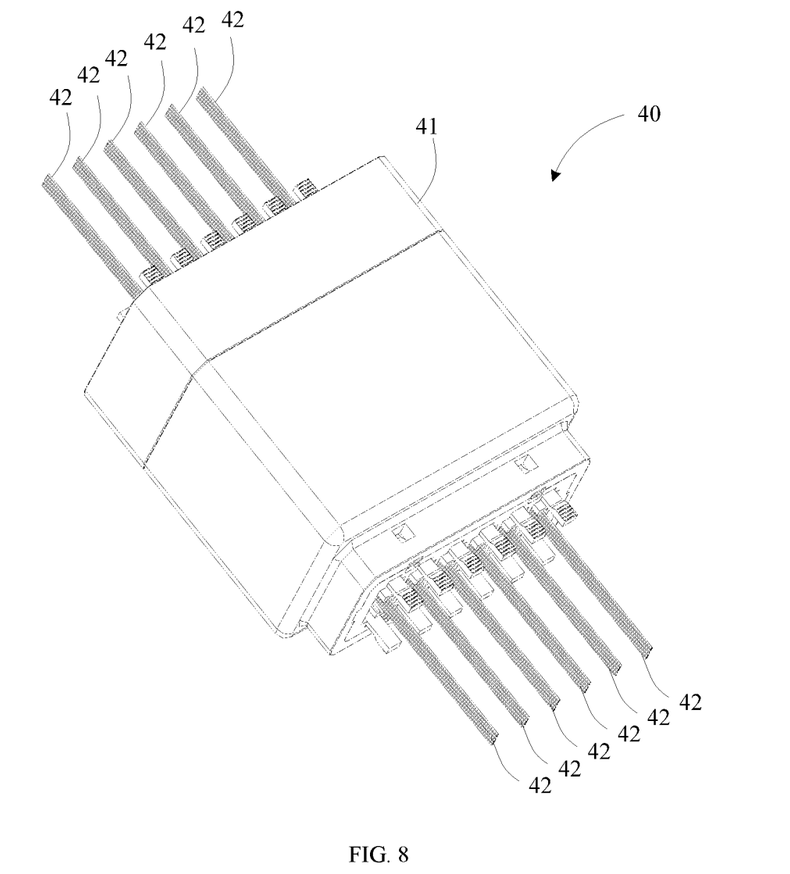
FIG. 8 is a schematic view of an assembled structure of a cable assembly according to another embodiment of the present disclosure.

FIG. 8 is a schematic view of an assembled structure of a cable assembly according to another embodiment of the present disclosure. In the embodiment, a cable assembly 40 is provided. The cable assembly 40 may be specifically a fiber optic cable assembly for connecting a fiber optic cable such that the light energy output from a transmitting fiber optic cable can be maximally coupled to a receiving fiber optic cable.

Specifically, the cable assembly 40 may include a female base 41 and at least two cable plugs 42. The female base 41 may be an adapter and include a first end face and a second end face arranged back from each other. The first end face and the second end face of the female base 41 each have at least one interface 411, respectively. The at least two cable plugs 42 are each configured to connect to one interface 411 of the female base 41 to terminate the cable fixed therewith with the female basis 41, thereby realizing the transmission of the optical signal. Specifically, one cable plug 42 corresponds to one interface 411.

Specifically, the cable plug 42 may be the cable plug 20 provided in the above embodiments, the specific structure and function of which can be found in the specific structure and function of the cable plug 20 provided in the above embodiments, and the cable plug 42 can achieve the same or similar technical effect, which will not be repeated herein.

In the cable assembly 40 provided in the embodiment, with the female base 41 and cable plug 42, at least one interface 411 is arranged on the first end face and second end face of the female base 41, and the cable plug 42 is plugged into the interface 411 of the female base 41 for optical signal transmission. Since the structure of the cable plug 42 is relatively simple, and there is no need for another outer shell, making the cable assembly 40 more integrated. In addition, the core base 11 of the cable plug 42 is directly or indirectly fixed with the first fixed member 12, such that the plug base 11 in the plugging process will be pulled out together to prevent the problem of the core base 11 left in the female base 41.

The above is only the implementation of the present disclosure, not to limit the scope of the present disclosure, all the equivalent structure or equivalent process transformation using the content and the attached drawings of the present disclosure, or directly or indirectly used in other related technical fields, are included in the scope of the present disclosure.

What is claimed is:

1. A connection assembly, comprising:
   a core base, configured to fix an end of a cable and comprising a first clamping portion; and
   a first fixing member, arranged with at least one second clamping portion and defining a first recess in an axial direction; wherein the first recess opens laterally and is configured to laterally accommodate a first portion of the cable different from the end of the cable, and the at least one second clamping portion is configured to fix the core base by directly or indirectly cooperating with the first clamping portion.

2. The connection assembly according to claim 1, wherein the core base is configured to insert the cable into a female base, and the at least one second clamping portion is configured to be snap-fitted with a third clamping portion on the female base to positional limit the core base to the female base.

3. The connection assembly according to claim 2, wherein the first fixing member is arranged with a first connecting arm and a second connecting arm extending in the axial direction on opposite sides of the first fixing member; the first connecting arm and the second connecting arm extend in a same direction; an end of the first connecting arm comprises a fourth clamping portion, and an end of the second connecting arm comprises another fourth clamping portion; the fourth clamping portion of the first connecting arm and the fourth clamping portion of the second connecting arm are each configured to directly or indirectly cooperate with the first clamping portion to relatively fix the core base and the first fixing member.

4. The connection assembly according to claim 3, wherein an end of the first fixing member is arranged with a first limiting plate; an extension direction of the first limiting plate is the same as an extension direction of the first connecting arm and the second connecting arm; the first limiting plate, the first connecting arm, and the second connecting arm define a holding slot corporately, the holding slot being open along the axial direction, the holding slot being open laterally in a same direction as the first recess; the holding slot communicates with the first recess and is configured to laterally accommodate a second portion of the cable; the second portion is a portion of the cable between the end of the cable and the first portion.

5. The connection assembly according to claim 3, further comprising:
   at least one elastic member, arranged between the core base and the first fixing member, and capable of directly or indirectly resiliently resisting the core base and the first fixing member, such that the first fixing member provides the core base a force that pushes the core base to the female base in the axial direction.

6. The connection assembly according to claim 5, wherein the at least one elastic member is at least partially embedded between the first connecting arm and the second connecting arm.

7. The connection assembly according to claim 6, wherein the at least one elastic member is a semi-enclosed member forming a slot that laterally accommodates a second portion of the cable; the second portion is a portion of the cable between the end of the cable and the first portion.

8. The connection assembly according to claim 7, wherein a minimum width of an opening of the slot of the semi-enclosed member is less than a maximum slot width of the slot, and the minimum width of the opening of the slot of the semi-enclosed member is less than or equal to the width of the cable; the maximum slot width of the slot is greater than the width of the cable.

9. The connection assembly according to claim 8, wherein the opening of the slot is in a same direction as the opening of the holding slot.

10. The connection assembly according to claim 7, wherein the at least one elastic member is curved.

11. The connection assembly according to claim 7, wherein the first fixing member is further arranged with the first limiting plate and at least one second limiting plate; the at least one second limiting plate is located on a side of the first connecting arm and the second connecting arm opposite to the first limiting plate; the at least one second limiting plate, the first limiting plate, the first connecting arm, and the second connecting arm form a limiting space to prevent the at least one elastic member embedded between the first connecting arm and the second connecting arm from radially falling out of the limiting space.

12. The connection assembly according to claim 11, wherein a cross-section of the limiting space perpendicular to the axial direction is rectangular in shape, and the shape of the at least one elastic member matches the shape of the limiting space.

13. The connection assembly according to claim 11, wherein an extension direction of the first limiting plate and the at least one second limiting plate is the same as the extension direction of the first connecting arm and the second connecting arm; the first limiting plate is arranged back from the opening of the slot; the number of the at least one second limiting plate is more than one, and each of the at least two second limiting plates is arranged corresponding to a side of the opening of the slot.

14. The connection assembly according to claim 13, wherein a spacing between the at least two second limiting plates is the same as the width of the opening of the first recess.

15. The connection assembly according to claim 6, wherein the first fixing member is further arranged with the first limiting plate and a second limiting plate; the second limiting plate is located on a side of the first connecting arm and the second connecting arm opposite to the first limiting plate; the second limiting plate, the first limiting plate, the first connecting arm, and the second connecting arm form a limiting space; the number of the at least one elastic member is more than one, and the at least two elastic members are arranged along a radial direction of the limiting space correspondingly at edges of both sides of the limiting space and extend along an axial direction of the limiting space; the axial direction of the limiting space is the same as an extension direction of the first recess.

16. The connection assembly according to claim 5, further comprising:
a second fixing member, configured to fix the core base on the first fixing member; the second fixing member is arranged with at least one fifth clamping portion, at least one sixth clamping portion, and a second recess in the axial direction; the second recess is configured to laterally accommodate a third portion of the cable, the third portion being a portion of the cable between the end of the cable and a second portion of the cable;
the second portion is a portion of the cable between the end of the cable and the first portion; the at least one elastic member is arranged between the first fixing member and the second fixing member, resiliently resisting the first fixing member and the second fixing member; the fourth clamping portion of the first connecting arm and the fourth clamping portion of the second connecting arm are each snap-fitted to a corresponding fifth clamping portion to relatively fix the second fixing member and the first fixing member; the at least one sixth clamping portion is snap-fitted with the first clamping portion to relatively fix the second fixing member and the core base.

17. The connection assembly according to claim 16, wherein the number of the at least one fifth clamping portion is more than one; the at least two fifth clamping portions are each arranged on opposite sides of the second fixing member; the fourth clamping portion of the first connecting arm and the fourth clamping portion of the second connecting arm are arranged toward each other and each snap-fitted with a corresponding fifth clamping portion.

18. The connection assembly according to claim 16, wherein the second fixing member is arranged with at least two third connecting arms; the at least two third connecting arms are distributed along a circumferential direction of the second fixing member and are oriented in a same direction; the number of the at least one sixth clamping portions is more than one, and the at least two sixth clamping portions are each arranged at an end of a corresponding third connecting arm.

19. A cable plug, comprising:
a cable; and
a connection assembly, configured to laterally accommodate the cable and fixed to the cable;
wherein the connection assembly comprises:
a core base, configured to fix an end of the cable and comprising a first clamping portion; and
a first fixing member, arranged with at least one second clamping portion and defining a first recess in an axial direction; wherein the first recess opens laterally and is configured to laterally accommodate a first portion of the cable different from the end of the cable, and the at least one second clamping portion is configured to fix the core base by directly or indirectly cooperating with the first clamping portion.

20. A cable assembly, comprising:
a female base, comprising a first end face and a second end face; wherein the first end face and the second end face of the female base each have at least one interface; and
at least two connection assemblies, each connected to a corresponding interface of the female base;
wherein each of the at least two connection assemblies comprises:
a core base, configured to fix an end of a cable and comprising a first clamping portion; and
a first fixing member, arranged with at least one second clamping portion and defining a first recess in an axial direction; wherein the first recess opens laterally and is configured to laterally accommodate a first portion of the cable different from the end of the cable, and the at least one second clamping portion is configured to fix the core base by directly or indirectly cooperating with the first clamping portion.

* * * * *